United States Patent [19]
Mergenthaler et al.

[11] Patent Number: 5,115,333
[45] Date of Patent: May 19, 1992

[54] VARIABLE LASER BEAM ATTENUATOR

[75] Inventors: Barry M. Mergenthaler, Cambridge; Paul O. Detwiler, New Concord, both of Ohio

[73] Assignee: NCR Corporation, Dayton, Ohio

[21] Appl. No.: 509,699

[22] Filed: Apr. 16, 1990

[51] Int. Cl.$^5$ ............ G02B 26/02; G06K 7/10
[52] U.S. Cl. .................. 359/196; 359/204; 359/209; 359/227; 359/236; 359/811; 359/813; 235/455; 235/462; 235/467
[58] Field of Search ........... 350/6.5, 252, 255; 235/455, , 462, 467; 359/196, 197, 204, 209, 236, 811, 819, 822, 894, 227, 234

[56] References Cited

U.S. PATENT DOCUMENTS

| | | |
|---|---|---|
| 3,635,545 | 1/1972 | VanKerkhove et al. . |
| 3,655,268 | 4/1972 | Reynolds . |
| 3,664,751 | 5/1972 | Haas . |
| 4,398,806 | 8/1983 | Bennett et al. . |
| 4,652,732 | 3/1987 | Nicki . |
| 4,664,484 | 5/1987 | Hines . |
| 4,711,526 | 12/1987 | Hennings et al. . |
| 4,778,263 | 10/1988 | Foltyn ............. 350/166 |
| 4,794,240 | 12/1988 | Schorr et al. . |
| 4,795,224 | 1/1989 | Goto ............ 235/467 |
| 4,797,551 | 1/1989 | Ferrante ............ 235/467 |
| 4,851,667 | 7/1989 | Mergenthaler et al. ....... 250/568 |
| 4,852,265 | 8/1989 | Rando et al. ........ 356/138 |

*Primary Examiner*—Bruce Y. Arnold
*Assistant Examiner*—R. D. Shafer
*Attorney, Agent, or Firm*—Richard W. Lavin

[57] ABSTRACT

An attenuator for varying the power of a laser scanning light beam includes a bracket having a reduced portion intermediate its ends enabling one end to be rotated around its other end. A glass element is secured to the movable end and is moved to a position which intercepts the laser light beam at an angle of incidence which varies in accordance with the amount of rotation of the movable end around the other end.

3 Claims, 3 Drawing Sheets

VARIABLE LASER BEAM ATTENUATOR

BACKGROUND OF THE INVENTION

This invention relates to optical attenuators and, more particularly, to a device for attenuating a polarized light beam. In optical bar code scanners which are found in retail stores, the power of the scanning light beam outputted by the scanner must be tightly controlled to meet both governmental regulations and performance requirements. Typically, this is accomplished by using a high power laser and attenuating the laser light beam. This usually requires a selection of one of several, relatively expensive, coated glass attenuators. Another technique for accomplishing this is to vary the degree of laser excitation. In the gas laser, for example, the tube current can be adjusted to effect a change in laser beam power. This technique is unattractive since it generally provides only a limited power variation and is accompanied by change in the operating frequency of the laser.

SUMMARY OF THE INVENTION

There is provided, in accordance with the present invention, an optical scanning unit which includes a laser whose output light beam is directed along a scanning light path. Mounted to a support portion of the optical scanner is a variable laser beam attenuator which consists of a thin glass window secured to the flexible end of a sheet metal bracket whose other end is attached to a rigid base mounted on a portion of the optical scanner. The laser will emit a collimated beam of light which is transmitted through the glass window. The laser is positioned such that the plane of polarization is perpendicular to the plane of incidence. The laser beam strikes the window at an angle of incidence the value of which may be varied over a wide range by bending the flexible end of the bracket about a pivotal portion of the bracket secured to the rigid base. The bracket has a reduced cross-section in this pivotal portion to ensure local deformation. As the beam of the light strikes the glass, a certain portion is reflected at both outer surfaces of the glass window which tends to reduce the power of the laser beam that is transmitted through the glass window. The amount of light reflected depends on the angle of incidence at which the beam strikes the window. Thus, the amount of power transmitted through the window can be changed by bending the bracket.

It is therefore a principal object of this invention to provide a variable laser beam attenuator which can be manually adjusted to vary the power output of a laser.

It is another object of this invention to provide a variable attenuator which is simple in construction and low in cost.

BRIEF DESCRIPTION OF THE DRAWINGS

These and other objects, features and advantages of the invention, as well as the invention itself, will become more apparent to those skilled in the art in light of the following detailed description taken into consideration with the accompanied drawings wherein like reference numerals indicate like or corresponding parts throughout the several views and wherein.

DESCRIPTION OF THE PREFERRED EMBODIMENT

Figure 1:
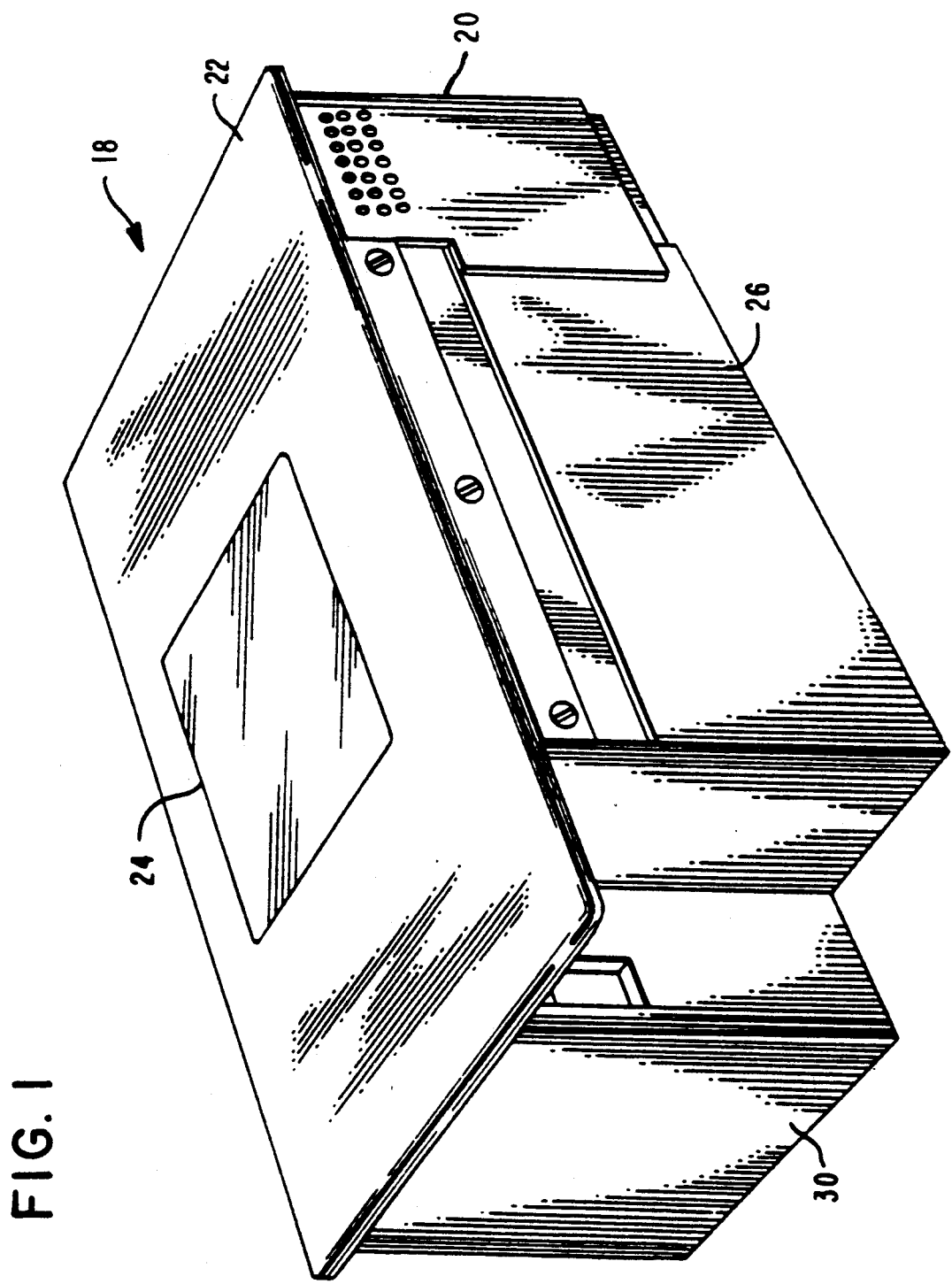
FIG. 1 is a perspective view of the optical scanner in which the present invention is incorporated.
Figure 2:
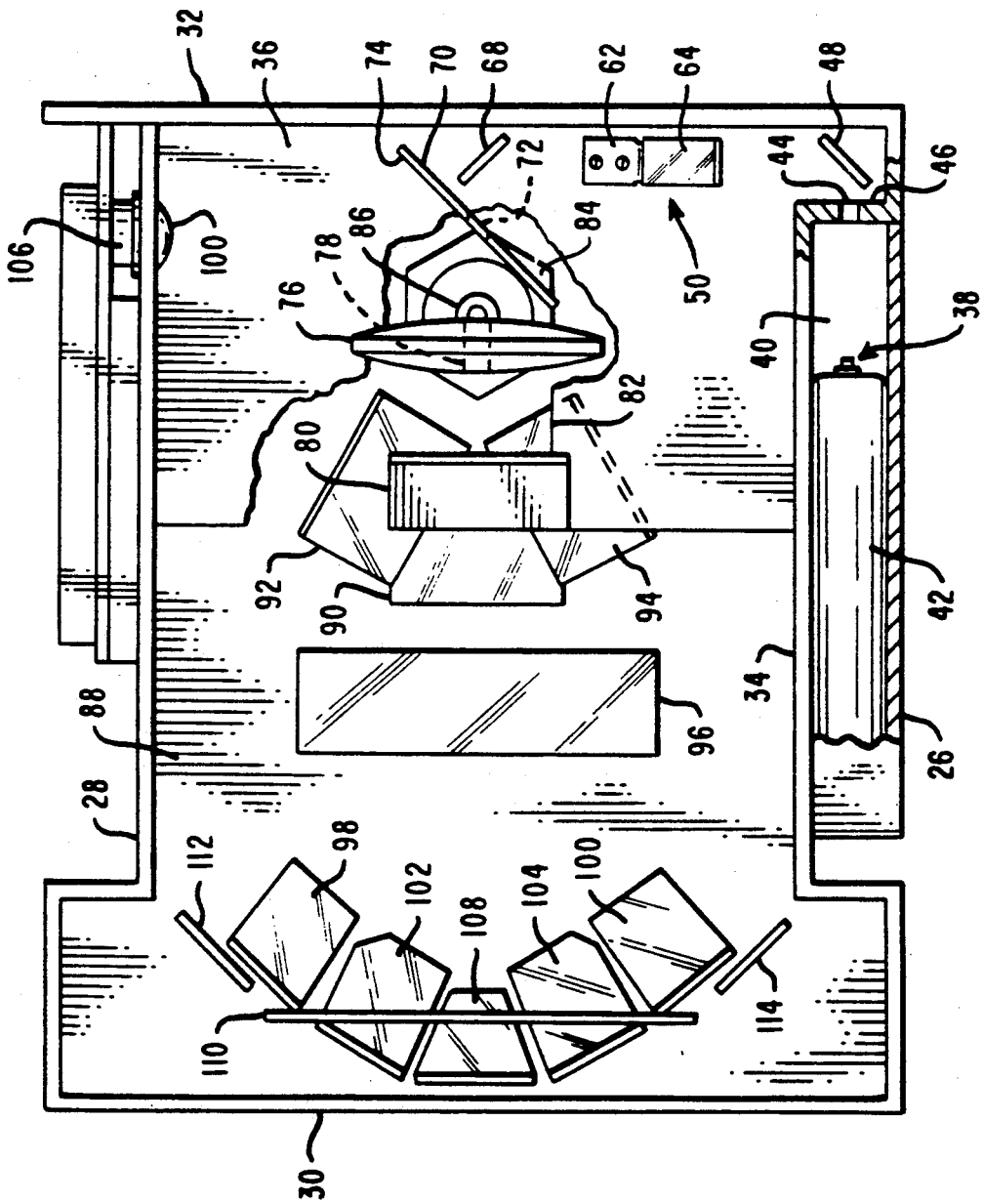
FIG. 2 is a top view of the optical scanner with a cover and a portion of the shelf removed showing the location of the laser and the variable attenuator.

Referring now to FIG. 1 there is shown a perspective view of an optical scanner generally indicated by the numeral 18 in which the present invention may be incorporated. The optical scanner is fully disclosed in U.S. Pat. No. 4,851,667 which is assigned to the assignee of the present invention. The scanner 18 comprises a box-like structure 20 which includes a cover portion 22 having centrally located therein a glass cover aperture 24. While the present invention is disclosed as being incorporated into a portable optical scanner, it is obvious that the invention can be utilized in scanners which are mounted within a checkout counter or in a hand-held scanner for scanning bar code labels. The structure 20 includes a pair of side wall portions 26 and 28 (FIG. 2) and front and rear wall portions 30 and 32 (FIG. 2). The structure 20 is normally mounted within a checkout counter (not shown) whose supporting surfaces are coplanar with the top surface of the cover portion 22 enabling a purchased merchandise item having a UPC coded label attached thereto to be moved past the aperture 24 as part of a checkout operation.

Figure 3:
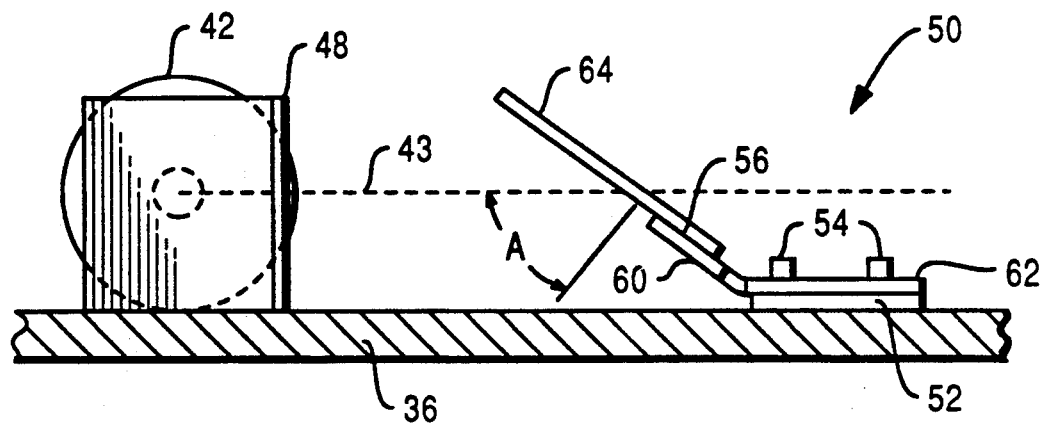
FIG. 3 is an enlarged partial side view of the optical scanner showing a detailed side view of the variable attenuator of the present invention and the laser.
Figure 4:
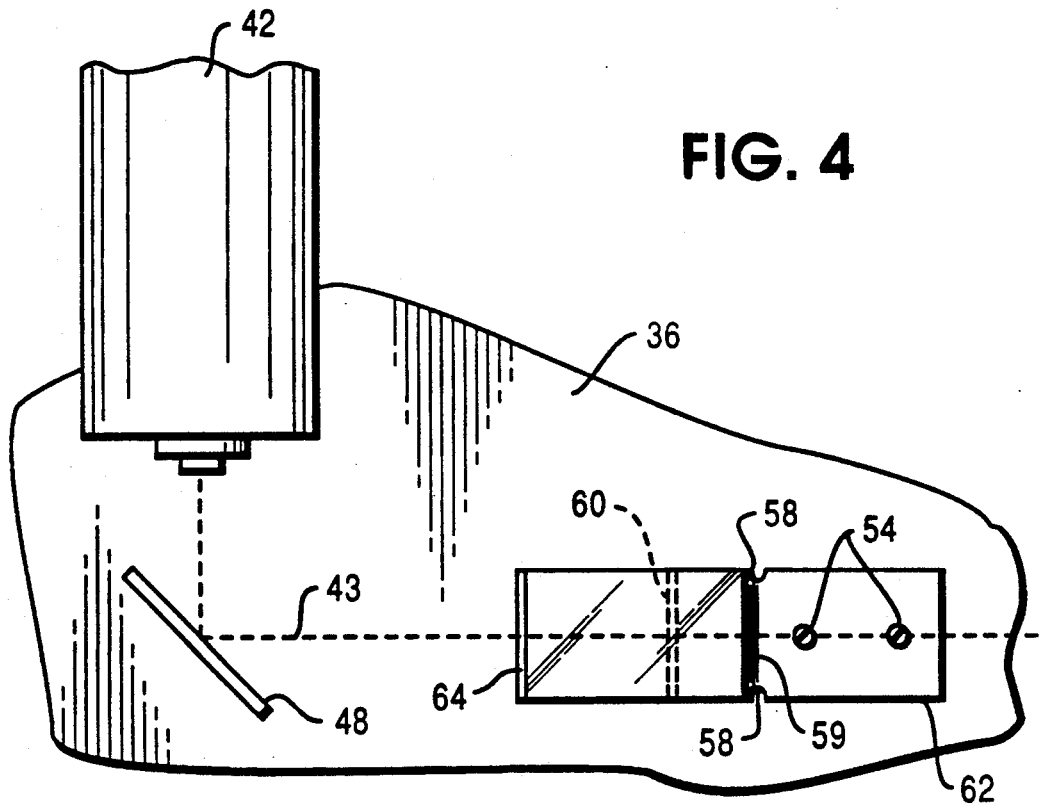
FIG. 4 is an enlarged partial top view of the optical scanner showing a detailed top view of the variable attenuator of the present invention and a portion of the laser.

Referring now to FIGS. 2-4 inclusive, there are shown structural details of the optical scanner and the attenuator of the present invention. Extending between the side wall portions 26, 28 and an inner side wall portion 34 of the structure 20 is a shelf member 36. The inner side wall portion 34 and the side wall portion 26 form a compartment generally indicated by the numeral 38 in which is located a Helium Neon laser 42 secured to the side wall portion 34, which projects a coherent light beam 43 through an aperture 44 located in a rear wall portion 46 of the compartment 38. Positioned adjacent the aperture 44 and mounted on a shelf member 36 is a routing mirror 48 positioned at a 45 degree angle to the center line of the aperture 44. Mounted on the shelf member 36 adjacent the rear wall portion 32 is the attenuator assembly of the present invention generally indicated by the numeral 50. The attenuator assembly 50 includes a base member 52 (FIG. 3) secured to the shelf member 36 in any conventional manner and to which is attached by means of rivets 54 a sheet metal bracket 56 having located along its edges a pair of opposed notches 58 forming a reduced portion 59 intermediate the ends of the bracket member 56 in which the end portion 60 of the bracket member extends at an angle to the path of the coherent light beam 43. Because of the reduced portion 59, the end portion 60 is movable to a set position about the end portion 62 of the bracket member secured to the base member 52. The bracket member 56 is preferably constructed of cold rolled steel which has been found to hold its set position without exhibiting any tendency to spring back after being moved to the set position. Secured to the upper surface of the end portion 60 by any conventional method such as the use of an adhesive is a glass substrate 64 (FIG. 3) which is orientated at an angle of incidence A to the laser light beam 43.

In operation, the laser 42 is caused to emit the collimated beam of light 43 which is deflected by the routing mirror 48 through the glass substrate 64. The laser 42 is positioned such that the plane of polarization is perpendicular to the plane of incidence as shown in FIG. 3. The value of the incidence angle may be varied over a wide range by bending the end portion 60 of the bracket member 56 about the reduced portion 59. In the present embodiment, the incidence angle A is equal to or greater than 60 degrees. As the light beam 43 strikes the substrate 64, a certain portion of the light beam is reflected. This reflection occurs at both surfaces of the substrate, which tends to reduce the power of the light beam that is transmitted through the substrate. The amount of light reflected at each surface of the substrate depends on a number of factors. These include the indices of refraction of the substrate material and the surrounding medium typically, air, and the incidence angle A. The dependence on the incidence angle is especially strong for light polarized in a plane perpendicular to the plane of incidence, and for incidence angles above 60 degrees. Thus the amount of power of the light beam transmitted through the substrate 62 can be changed by bending the bracket member 56, thus changing the angle of incidence.

Referring again to FIG. 2, there is shown mounted on the shelf member 36 adjacent the attenuator assembly 50 a second routing mirror 68 positioned at a 45 degree angle to the rear wall portion 32. Mounted on a shelf member 36 adjacent the routing mirror 68 and extending in a direction perpendicular to the orientation of the routing mirror 68 is a transparent collection mirror 70 which includes an aperture 72 extending through the mirror 70. The mirror 70 has one side 74 constructed to reflect light beams impacting thereon in a manner that is well known in the art. Mounted on the shelf member 36 and located adjacent the collection mirror 70 is a bifocal lens member 76 which includes a lenslet portion 78. The bifocal lens member 76 is constructed to focus the light beam reflected from a scanned UPC code label onto a photodetector 106 while the lenslet portion 78 is constructed to focus a laser beam 43 on a UPC coded label (not shown) positioned adjacent the aperture 24 (FIG. 1). Mounted at an angle of 65 degree to the shelf member 36 is a routing mirror 80 which deflects the light beam transmitted through the aperture 72 in the collection mirror and the lenslet portion 78 in the bifocal lens member 76 in a downward direction through a recess portion 82 in the shelf member 36 to a position beneath the shelf member 36. The reflected light beam impinges on a multifaceted mirrored spinner 84 which is rotatably mounted on a drive motor 86 secured to the lower surface of the shelf member 36 for rotating the spinner 84 at a predetermined speed.

Mounted at an angle to the floor portion 88 of the structure 20 is a center lower pattern mirror 90 while secured to brackets (not shown) mounted on the floor portion 88 are a right lower pattern mirror 92 and a left lower pattern mirror 94. Mounted at a slight angle to the floor portion is a center upright pattern mirror 96. Located adjacent the front wall portion 30 of the structure 20 and mounted at an angle of 72 degrees to the floor portion 88 are a right end lower pattern mirror 98 and a left end lower pattern mirror 100. Mounted at an angle of 71 degrees to the floor portion 88 is a right middle lower pattern mirror 102 and a left middle lower pattern mirror 104. Mounted at an angle 65 degrees to the floor portion 88 is a center pattern mirror 108.

Mounted to the front wall portion 30 in a direction off-set to a vertical plane by three degrees is a center top pattern mirror 110, a right top pattern mirror 112 oriented 49 degrees to the mirror 110 and a left top pattern mirror 114 oriented 49 degrees to the mirror 110. The mirrors 98-108 inclusive act together with the mirrors 110-114 inclusive to direct the scanning light beams received from the pattern mirrors 92-96 inclusive through the aperture 24 (FIG. 1) to form a scanning pattern (not shown) for use in scanning a bar code label positioned adjacent the aperture 24.

After striking the UPC label, the diverging reflected light beams are retrodirected through the aperture 24 to the pattern mirrors 98-114 inclusive and to the spinner 84 (FIG. 2) which directs the reflected light beams towards the routing mirror 80 from where the light beams are directed to the bifocal lens member 76. The lens member 76 will focus the received light beams at the photodetector 110 by directing the reflected light beams towards the collection mirror 70 which reflects the received light beams towards the lens member 100 which in turn filters out all wavelengths of light except that of the laser light beam. The filtered light beams will enable the photodetector to generate electrical signals which accurately represent the data contained in the bar code label.

It will be seen from this construction that the attenuator assembly of the present invention provides a very easy and simple mechanism for adjusting the power output of the laser member 42.

Although the preferred embodiment of the present invention has been described herein, it is intended that the invention not be restricted thereto but that it be limited only by the true spirit and scope of the appended claims.

What is claimed is:

1. An apparatus for projecting scanning light beams at a coded label on an object comprising:
    a supporting surface;
    a source of scanning light beams projected along an axis adjacent said supporting surface;
    an elongated support member having one end secured to said supporting surface and its opposite end being movable to a position orientated at an angle to the supporting surface, said support member having a reduced portion intermediate its ends enabling said opposite end to be rotated about said one end;
    an optical transparent element secured to said opposite end of the support member and extending to a position across the axis of the light beam for varying the power of the light beam projected along said axis in accordance with the angle of incidence of the light beam striking the element, said element varying the angle of incidence in accordance with the amount of rotation of the opposite end;
    means mounted along said axis for projecting said light beam along a plurality of light paths; and
    reflecting means mounted in each of said plurality of light paths for forming a scanning pattern for scanning a coded label in response to receiving said plurality of light beams.

2. The apparatus of claim 1 in which the elongated support member includes a pair of oppositely positioned notched portions forming the reduced portion of the support member.

3. The apparatus of claim 2 in which said support member comprises a bracket member constructed of cold rolled steel.

* * * * *

UNITED STATES PATENT AND TRADEMARK OFFICE
CERTIFICATE OF CORRECTION

PATENT NO. : 5,115,333

DATED : May 19, 1992

INVENTOR(S) : Mergenthaler et al.

It is certified that error appears in the above-identified patent and that said Letters Patent is hereby corrected as shown below:

Column 4, line 49, "optical" should be --optically--.

Signed and Sealed this

Sixteenth Day of November, 1993

Attest:

BRUCE LEHMAN

Attesting Officer

Commissioner of Patents and Trademarks